JUDSON S. SWEARINGEN
INVENTOR

BY Browning, Hyer,
Ericksrott & Thompson
ATTORNEYS

JUDSON S. SWEARINGEN
INVENTOR

BY
ATTORNEYS

United States Patent Office 3,561,227
Patented Feb. 9, 1971

3,561,227
ABSORPTION REFRIGERATION SYSTEM, METHOD AND APPARATUS FOR EXTERNAL CIRCULATION OF ABSORBENT
Judson S. Swearingen, Los Angeles, Calif., assignor to Judson S. Swearingen, trustee of Swearingen Trust D
Filed Aug. 5, 1968, Ser. No. 750,054
Int. Cl. F25b 15/06
U.S. Cl. 62—103                    8 Claims

ABSTRACT OF THE DISCLOSURE

An absorption refrigeration method comprising passing a refrigerant through an evaporation zone having a pressure therein low enough to produce evaporation of at least a portion of the refrigerant and consequent cooling of the unvaporized portion thereof, heat exchanging the unvaporized refrigerant with a medium sought to be cooled, thereby warming the refrigerant, and returning the so warmed refrigerant to the evaporation zone, withdrawing at least a portion of the vaporized refrigerant through a mist eliminator into a closed absorption zone in communication with said evaporation zone, spraying a liquid absorbent into the absorption zone to absorb the vaporized refrigerant, circulating the partially spent liquid absorbent externally of the absorption zone in indirect heat exchange relation with a cooling medium to extract the heat of condensation and absorption and spraying the cooled partially spent absorbent back into the vaporous refrigerant in the absorption zone to absorb additional refrigerant, the rate of partially spent absorbent sprayed back into the absorption zone is controlled as a function of evaporation zone temperature thus eliminating the time lag generally associated with most absorption refrigeration control schemes. The invention also provides a system whereby the above absorption refrigeration method may be carried out.

---

This invention has to do primarily with a refrigeration system in which the refrigeration is utilized at a central station or at a plurality of smaller substations to process air for air conditioning purposes. More particularly, it relates to an absorption refrigeration system which in the example, hereinafter described employs water as the refrigerant and lithium bromide as an absorbent.

Air conditioning for human comfort requires that the air be cooled down to about 60 degrees F. so as to reduce its humidity to such a point that when warmed again to around 73 degrees F. it will have about 65% humidity. Usually coils carrying cooled water chill the air which is blown over the coils. The water is cooled to about 40 degrees F. by refrigeration and after cooling the air it returns at about 50 degrees F. for further cooling. It is cooled by evaporation of refrigerant which may also be water which for this purpose must be evaporated below 40 degrees F., usually between 36 degrees F. and 38 degrees F. It cannot, of course, go below 32 degrees F. without freezing.

If lithium bromide be used as the absorbent it will work down to a pressure corresponding to 36 degrees F. to 38 degrees F. with the absorbent temperature about100 degrees F. but tends to crystalize if so concentrated that it will operate on a greater temperature difference than 62 degrees F. to 64 degrees F. On the other hand, it is not practical to cool the lithium bromide solution down to 100 degrees F. by air which may already be at 100 degrees F. because economical air cooling at this point requires 10 degrees F. to 20 degrees F. temperature difference.

Assuming air cooling of the absorbent down to 100 degrees F. the temperature difference between it and the refrigerant evaporation point of 65 degrees F., which is a refrigerant boiling point of 45 degrees F., the cooling of the ultimate air through the medium of a captive circulating water which was cooled by the evaporating refrigerant cannot be practically accomplished. This becomes even less practical when the absorber tube surfaces are required to be cooled by another captive circulating water stream which in turn is cooled by air.

In this invention the absorbent is circulated through and cooled by the air cooling system, or other heat dissipating system, and the refrigerant is circulated directly through the air cooling coils.

An object of this invention is to provide an air conditioning refrigeration system in which the temperature spread between the available absorbent temperature and the temperature to which air may be cooled by the system will be increased to the point that adequate cooling of the air for dehumidification may be accomplished, for example, by an available heat dissipation temperature of 100 degrees F.

Another object of this invention is to provide a refrigeration system of the absorption type which will not require tubes in the evaporator which are normally provided and on the outside of which the refrigerant normally evaporates to chill a captive circulating stream of water or the like.

Another object of this invention is to provide a refrigeration system which will not require tubes in the absorber.

Another object of this invention is to provide an absorption refrigeration system which can use either a single effect or a two effect regenerator system and in which if the single effect system be used the condenser may be air cooled, while if a two effect system be used the second effect refrigerant condenser may also be air cooled.

Other objects and advantages of this invention will become apparent from the following description taken in connection with the accompanying drawings wherein are set forth by way of illustration and example certain embodiments of this invention.

Figure 1:
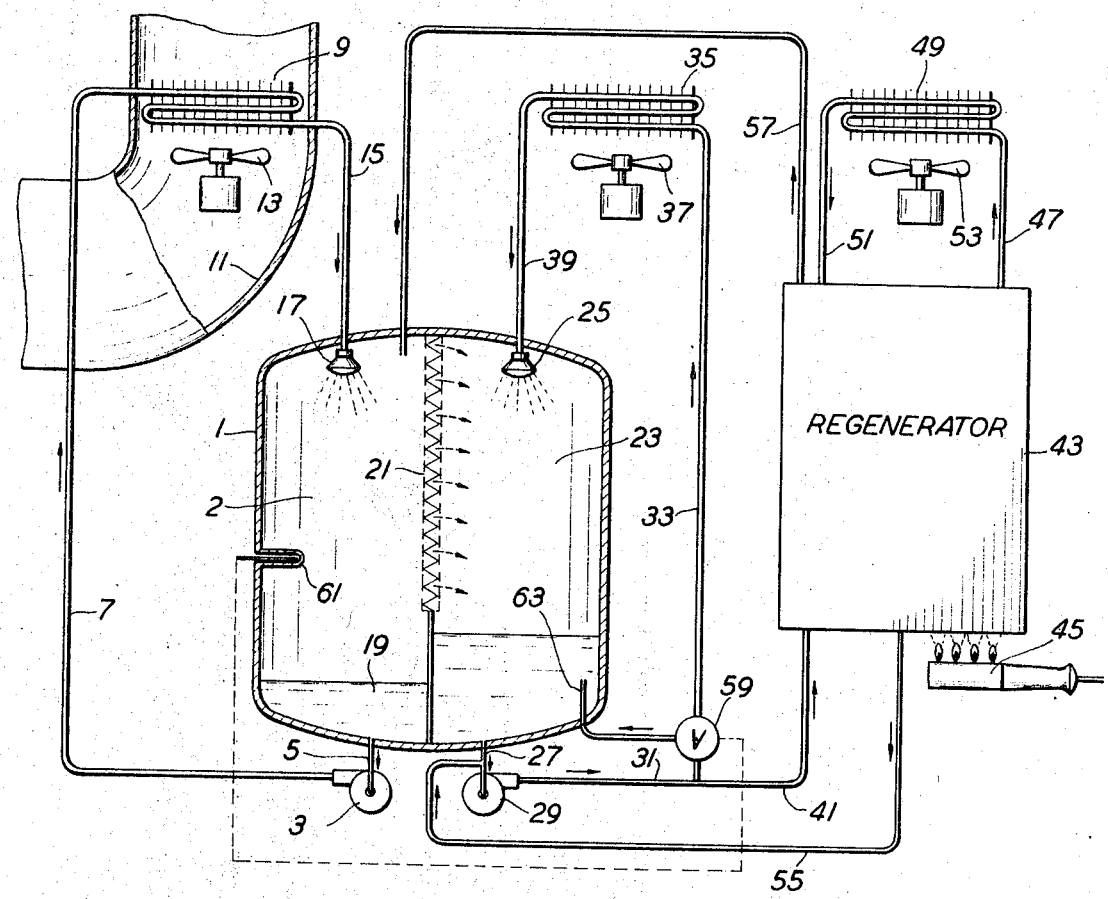
FIG. 1 is a diagrammatic illustration of an absorption refrigeration system constructed in accordance with this invention.

In accordance with the specific disclosures of this invention as set forth in the drawings and hereinafter described, this invention contemplates that the refrigerant will be evaporated by being sprayed into a closed chamber where it flash evaporates and chills itself by partial evaporation instead of in the usual tube type evaporator. This chamber freely communicates with the absorber chamber but has spray eliminators therebetween to prevent liquid refrigerant from passing through into the absorber section. The chilled refrigerant in liquid form is then pumped from the bottom of the evaporator chamber and through coils over which is circulated the air or other medium to be cooled by the system. Thus the refrigerant itself conveys the chilling to the air instead of employing an intermediate liquid which is chilled by evaporation in tubes in the evaporator section and then circulated to the point where air is heat exchanged therewith to cool the air. Then the somewhat warmer refrigerant is returned to the top of the evaporator chamber into which it is injected through a sprayer which cominutes the refrigerant and causes substantial evaporation thereof whereby the remaining liquid portions of the refrigerant are again chilled and made ready for another cycle through the air cooling coils. Power for the operation of the spray is supplied by the same pump which circulates the refrigerant.

The evaporation chamber is desirably maintained under rather high vacuum so as to promote evaporation at a fairly low temperature depending upon the requirements of the system.

In this system also the customary tubes employed in an absorber are not required. Instead, the absorbent in liquid form is sprayed into a closed chamber to contact the refrigerant vapor passing from the evaporator chamber and absorb it. Its heat of condensation is taken up by sensible heat increasing the temperature of the absorbent as it passes through the absorber, and this heat is removed by withdrawing the absorbent thus partially spent and circulating it through an atmospheric cooler where it is contacted with air or other cooling medium by indirect contact. Again, the spraying of the absorbent liquid into the absorber chamber is powered by the same pump which circulates the absorbent liquid from the bottom of the absorber chamber through the air cooler and back to the spray head within the top of the absorber chamber. The temperature rise in the absorber may be controlled to a small value by expediting the circulation.

Refinements of the system involve the use of the supply of absorbent to provide a liquid column compressor for removing fixed gases which tend to accumulate in the upper portion of the absorber, or alternatively, supplying power for such ejection of fixed gases by means of a jet type ejector operated by refrigerant vapor. In either case, it is desirable that the gases being ejected by contacted with liquid absorbent in order to absorb refrigerant from its mixture with the fixed gases being withdrawn and thereby avoid loss of refrigerant when the fixed gases are drawn off externally of the absorber.

A further modification involves the evaporation of a portion of the refrigerant being sprayed into the evaporator chamber under such conditions that liquid not evaporated will be drained into the absorber chamber rather than being allowed to collect in the bottom of the refrigerant evaporator chamber. By this means liquid difficult to evaporate such as entrained absorbent in the evaporator-liquid refrigerant cycle may be purged on a substantially continuous basis during operation.

Referring now more in detail to the drawings, there is illustrated in each of the figures a closed vessel 1 divided into two chambers, one of which acts as an evaporator chamber, or simply an evaporator 2 in which refrigerant is evaporated. A pump 3 is provided for drawing liquid refrigerant from the bottom of the evaporator chamber through a line 5 and discharging it through a line 7 with an air cooling coil 9 through which the liquid refrigerant from the bottom of the evaporator chamber 2 is circulated while air is blown over the outside of such coil to an air duct 11 by means of a fan 13 or the like. The liquid refrigerant from the coil 9 is then conducted through a return line 15 into the upper portion of the evaporator chamber 2 and discharged into the evaporator chamber through a spray head 17 or other suitable device for comminuting the liquid refrigerant entering the evaporator chamber.

The evaporator chamber being kept at a relatively low pressure, evaporation of the sprayed in refrigerant will take place within this chamber to an extent which will cool the unevaporated or liquid refrigerant to a degree determined by the degree of low pressure maintained in the chamber. The thus cooled liquid refrigerant will be collected in a pool 19 at the bottom of the evaporator chamber from which it will be drawn by the pump 3 through the line 5 and conducted back through the air cooling coil 9 as hereinbefore described.

Refrigerant vapor from the evaporation within the evaporator chamber 2 will pass through a mist eliminator 21 which sepaartes the evaporator chamber from an absorber chamber 23 and within the absorber chamber 23 will be contacted by a liquid absorbent sprayed into the upper end of such chamber 23 by means of a spray head 25 or other suitable means for releasing comminuted absorbent.

The absorbent will thus be intimately contacted with the refrigerant vapor passing into the absorber chamber through the mist eliminator 21, and will absorb the same and collected in a pool in the lower portion of the absorber chamber from which it will be withdrawn through a line 27 by means of a pump 29. The thus partly spent absorbent will be circulated through the pump output line 31 and through a line 33 to an absorbent cooler, shown here as an atmospheric absorbent cooler 35 through which it passes while atmospheric air is being blown over the exterior thereof by a fan 37 to cool the partly spent liquid absorbent and thereby extract from it the heat of absorption and the latent heat of condensation of the refrigerant. The cooled partly spent absorbent is then passed from the atmospheric absorbent cooler through a line 39 to the spray head 25 where it is again sprayed into the absorbent chamber.

In order to supply to the system a regenerated absorbent so as to prevent the circulating absorbent from becoming completely spent and ineffective, and reconstituted refrigerant to replace that vaporized in the evaporator chamber 2, a portion of the partly spent absorbent pumped by the pump 29 through the line 31, is taken off from the stream returning to the atmospheric absorbent cooler and the spray head 25, and conducted through a line 41 to a suitable single or double-effect regenerator 43. Heat is supplied to the regenerator 43 by means of a burner 45 in well known fashion in order to drive off refrigerant from the absorbent. The refrigerant vapor thus evolved is circulated through a line 47 to an atmospheric refrigerant cooler 49 or other suitable cooler in which it is cooled and condensed by indirect heat exchange and then returned to the top of the regenerator through a line 51. Air may be supplied to the atmospheric refrigerant condenser by suitable means such as a fan 53.

Regenerated absorbent is taken off from the bottom of the regenerator through a line 55 and returned to the circulating absorbent cycle at any suitable point such as by injecting it into the line 27 from the bottom of the absorber chamber to the intake of the pump 29. This enables the pump 29 to supply the power necessary not only to circulate the absorbent collected in the lower portion of the absorbent chamber through the atmospheric absorbent cooler, but also to circulate absorbent into and back from the regenerator.

From the upper portion of the regenerator 43 reconstituted refrigerant is taken off through a line 57 to the point where it is reinjected into the upper portion of the evaporator chamber 2, thereby replacing refrigerant evaporated in said chamber which is thence passed into the absorber chamber 23 for absorption.

It will be apparent that the absorption of the refrigerant vapors in chamber 23 will prevent generation of such vapors from building up pressure in the evaporator chamber as well as in the absorber chamber and will thus tend to maintain the desired evaporation pressure within the evaporator chamber 2.

Although it would appear to be somewhat of a waste of regenerated absorbent to return it into the suction line of the pump, a portion of the discharge from which is sent to be regenerated, this seeming redundancy is explained by the fact that the stream is circulated through the spray head and absorber approximately twenty times before being regenerated so only approximately one-twentieth of that returned to the intake of the pump is immediately circulated back through the regenerator and thus wasted.

The system above described obviates the necessity for the usual large system of copper tubes in the absorber section and another bank of copper tubes in the evaporator section. Of course, the absorbent still rejects its heat to atmosphere through the atmospheric cooler 35 but such a cooler is necessary regardless of the construction of the absorber and hence the net saving of equipment in this portion of the system is reflected by the entire tube section normally present in the absorber. Also, the air cooler heat exchanger 9 must always be employed for areas to be cooled in heat exchange with whatever medium is employed to cool the air, but in this section of the system involving the circulating refrigerant, the necessity for heat exchange cooling coils in the evaporator has been eliminated by the present invention.

In this system, although somewhat more power is required for circulation of the refrigerant and the absorbent, no more power units are required and the advantage in reduction of overall temperature spread as hereinbefore outlined, is provided along with reduction of equipment in the form of the evaporator and absorber tube sections usually required.

In order not to involve a waste of absorbent or bring about undue chilling of the refrigerant and possible freezing when the ambient air temperature is low, it is necessary to have some control involved in the system. In the present instance this is supplied by means of a valve 59 which is preferably a three-way valve capable of directing flow either through the line 33 or laterally with respect thereto, or of dividing the flow between two such lines. This valve 59 is subject to control by a temperature sensing device 61 located in the evaporator chamber 2, and when valve 59 is actuated to deflect some of the flow from the line 33, such flow is preferably directed into a line 63 which reinjects it into the bottom of the absorption chamber 23. In such reinjection the location and direction of the end of the line 63 is such as to direct such absorbent toward the upper surface of the collection of absorbent in the bottom of the chamber 23 and thus provide the upper surface of this pool of absorbent which will be at the warmest temperature existing in the absorber chamber. The temperature sensing device is so arranged as to cause the valve 59 to reduce or completely interrupt circulation of absorbent back to the spray head 25 when the temperature within the evaporator chamber drops to an unduly low point. The valve 59 might merely throttle or shut off such circulation but in such case if it were closed or partly closed for an excessive length of time the pump 29 might become overheated and damaged. This is avoided by returning the pumped stream back into the liquid zone through the line 63 as just described. The direction of the absorbent through the line 63 toward the surface of the pool of absorbent in the absorber chamber 23 tends to cause a temperature rise in such pool until the vapor pressure of the absorbent reflects a higher temperature upon the temperature sensing device in the evaporator. The absorbent will again tend to flow through its atmospheric cooler.

The regenerator section for this system is substantially the same as in conventional systems. The substitution of air cooling for water cooling for the refrigerant condenser will have no great effect.

A trace of hydrogen is normally liberated in any absorption refrigeration system and other fixed gases may also collect such as in the case when air may leak into the system. Such gases collect or can be made to collect in the absorber adjacent the upper end or other selected portion thereof and if not disposed of will soon fill such a significant portion of the absorber chamber volume as to be come objectionable. Such gases are normally swept into the upper back portion of the chamber, being swept to the upper portion because the same is the location where the coolest and richest absorbent enters the chamber and because it is there that the absorbent absorbs vapor at the highest rate so that there is a draft of vapor in that direction. It is swept toward the back of the absorber because the vapor enters at the front and tends to sweep toward the rear, sweeping any fixed gas with it. If desired it may be collected in some other selected location.

Figure 2:
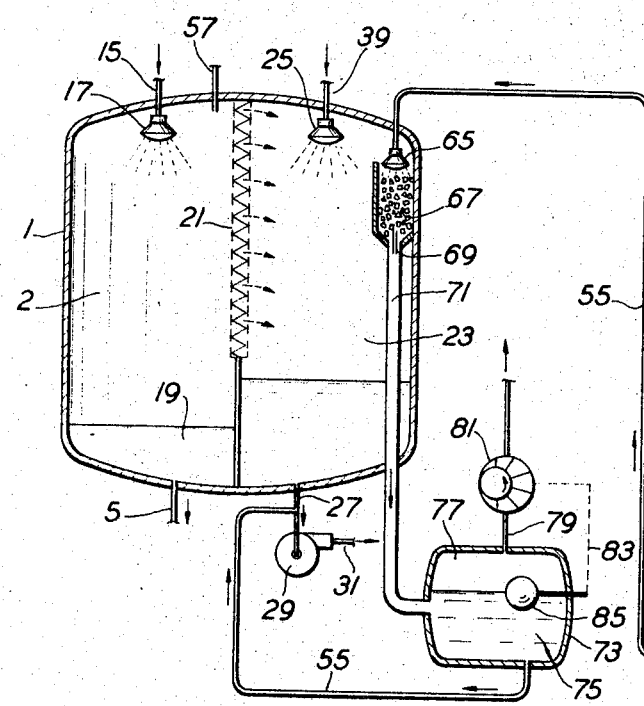
FIG. 2 is a view similar to the midportion of FIG. 1 illustrating a modification of the system illustrated in FIG. 1 which has for its purpose the purging of fixed gases from the refrigeration cycle during operation.
Figure 3:
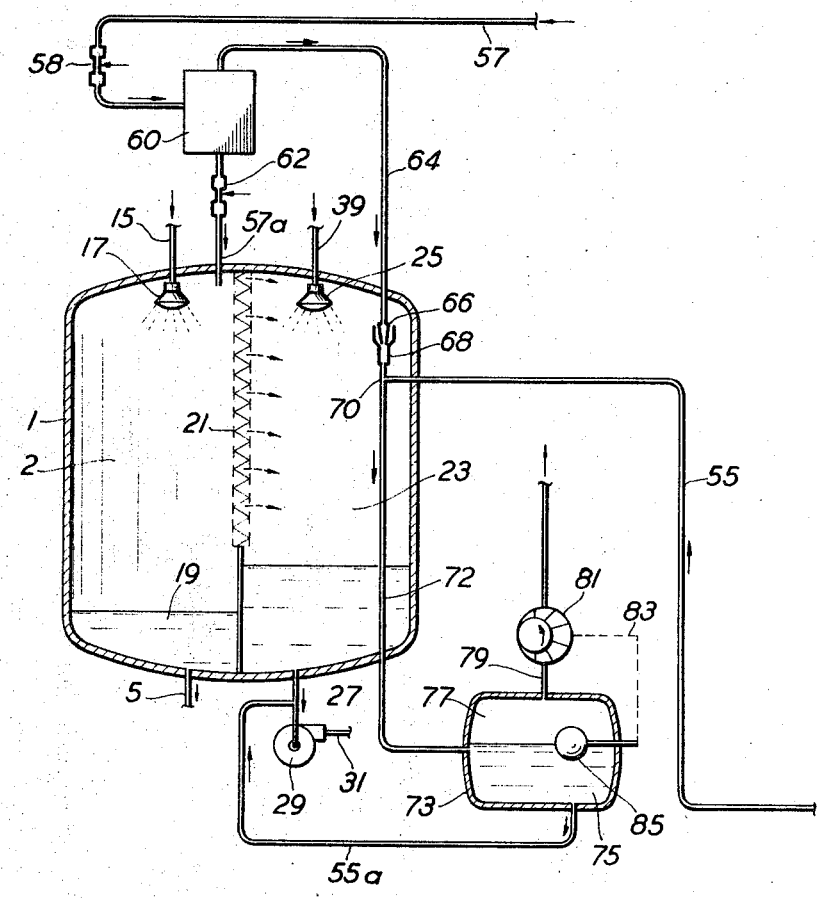
FIG. 3 is a view similar to FIG. 2 but in which the power for ejecting the fixed gases from the absorber portion of the system is obtained from an injector powered by refrigerant vapor instead of, as in FIG. 2, by a liquid column pump supplied by absorbent.

FIGS. 2 and 3 illustrate alternative means of withdrawing the fixed gases just mentioned, that shown in FIG. 2 utilizing hydraulic power and the absorbent power of the returning regenerated absorbent, while that shown in FIG. 3 utilizes refrigerant vapor in a jet type ejector for withdrawing the fixed gases.

The regenerated absorbent is normally returned to the absorber system at a low level in the over-all plant, as by being injected into the line 27 leading to the intake of the absorbent pump 29, but sufficient power is available as the absorbent returns from the regenerator through the line 55 to raise it to a point at least adjacent the upper end of the vessel 1. It is this additional power which is utilized in the form of the invention shown in FIG. 2 to eject or exhaust the fixed gas from the interior of the absorber chamber 23 at the upper outer corner thereof.

In FIG. 2 adjacent the upper outer corner of the chamber 23 there is provided a small column 67 with its upper end open and adjacent the upper outer corner of the chamber 23 at the point where fixed gases collect in greatest concentration. It is into the upper end of this column which serves as an absorption column that the returning regenerated absorbent is sprayed through an auxiliary sprayhead 65 and impinges on packing such as Raschig rings, Berl saddles, or the like. The rich absorbent absorbs in this column 67 a large quantity of vapor of the refrigerant and causes a high vapor velocity to flow into the column from the immediate environment of its inlet.

The result is that the fixed gas is drawn in with the vapor and concentrates in the column 67 so that further down the column (usually a matter of a few inches to a foot), the partial pressure of fixed gas in the column may be as much as 50% of the total pressure if the quantity of fixed gas present in the system is sufficient.

Still further down the column 67 there is provided a mixing nozzle 69 which can be of any of many forms to disperse the fixed gas at that point in the liquid which flows on down into a lower and much smaller cross section column 71. This lower column need not be packed, and is made small enough so that the downward velocity in it is greater than that of bubbles of gas arising within it with the result that the gas is carried down with the liquid in the column 71.

At the lowest available location in the refrigeration system, where is provided as shown in FIG. 2 a vessel or drum 73 having a space 75 therewithin in which the liquid absorbent with fixed gas entrained therein collects in a body 75 and becomes substantially quiescent. While it is quiescent the fixed gas tends to rise and escape from the body of liquid 75 forming a gas body 77 within the upper portion of the drum 73. An eduction line 79 leads from the uppermost portion of the drum 73 to a vacuum pump 81 or the like whose operation is controlled through a suitable connection 83 by a float 85 on the surface of the body of liquid 75 within the drum 73. Thus, when gas accumulates sufficiently to force the liquid level downward the pump will be caused to operate and exhaust sufficient fixed gas from the upper portion of the drum 73 to maintain the liquid at the desired level within this drum. The weight of the column of liquid within the column 71 thus serves as a liquid column type of pump for the purpose of eduction of the fixed gas from within the absorption chamber 23.

The absorbent from the absorbent body 75 within the drum 73 is returned to the system through a line 55a and injected as in the previous description into the inlet 27 of the pump 29.

In FIG. 3 the power for eduction of the fixed gas from the system is supplied in a slightly different fashion. With the use of air as the coolant for the refrigerant condenser the refrigerant in a system of this type accumulates at a rather high temperature and has an elevated vapor pressure. A substantial amount of such refrigerant, probably 5% or 10%, will flash vaporize on having its pressure released to that existing in the evaporator. As shown in FIG. 3, if this liquid be permitted to flash to a pressure corresponding to temperature drop in orifice 58 interposed in the refrigerant return line 57 leaving from the regenerator, about half of the flash gas is liberated at a considerably higher pressure than that in the evaporator, and with a separator 60 connected to the output from the orifice 58 such flash gas will be disengaged from the liquid portion of the refrigerant. Expansion of this liberated vapor to the absorber pressure represents a substantial amount of power. In order to utilize this power in ejecting fixed gas from the absorber, this gas is passed through a line 64 to a nozzle 66 discharging into an ejector device 68. This draws the fixed gas into the upper end of this ejector and carries it downward through the line 72 leading downward and through the bottom of the vessel 1 to the drum 73 which is of the same construction and operation as that previously described in connection with FIG. 2. Immediately below the ejector 68 the line 72 is joined by the line 55 returning regenerated absorbent from the regenerator, this regenerated absorbent being thereby introduced into the downcoming line 72 and hence intermingled with the fixed gas and refrigerant vapor being carried downwardly within that line. Thereby on the way downward through the line 72 and into the drum 73 this regenerated fresh absorbent will absorb large portions if not all of the refrigerant vapor. Then upon entry into the drum 73 the fixed gas will separate as before and be removed, the remainder of the operation of this portion of the system being the same as described in connection with FIG. 2.

Preferably, the refrigerant in the separator 60 will be retarded in its downward flow into the line 57a and into the upper end of the evaporator chamber 2 by means such as an orifice 62, thereby maintaining sufficient pressure differential on the gas through the line 64 to cause it to provide the ejection function above described.

It will be seen that the forms of the invention shown in FIGS. 2 and 3 will by the processes explained in connection therewith, be constantly purging from the system any fixed gas which may be entrained therein, thereby making each of these systems substantially fixed gas free.

Figure 4:
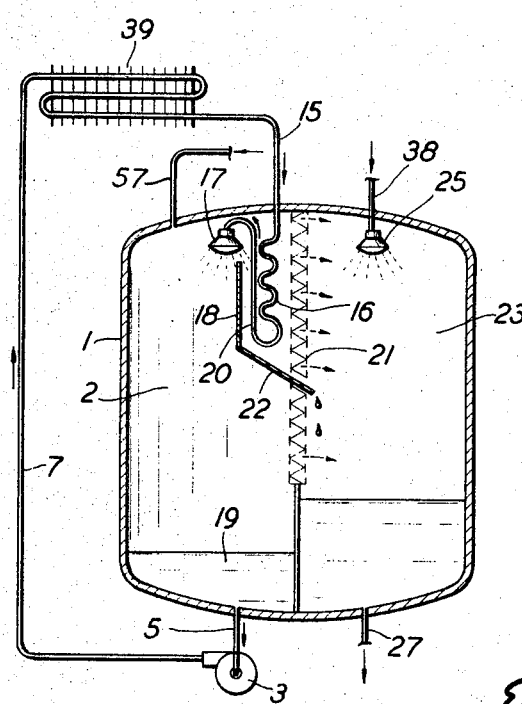
FIG. 4 is a view similar to the left-hand portion of FIG. 1 including the evaporator and absorber chambers and the air cooling coil, and illustrating a modification for the purpose of purging the evaporator portion of the cycle of entrained absorbent or other contaminating higher boiling point liquids.

There is the further possibility that refrigerant in systems such as those described may become contaminated as by carryover in the regenerator, and upon being recycled repeatedly in the evaporator the refrigerant may become more concentrated until the contaminant has accumulated in it to an objectionable degree. In the form of the invention illustrated in FIG. 4, the return line 15 carrying the refrigerant from the air chilling or cooling coil 39, does not lead directly to the sprayhead 17 as in FIG. 1, but instead leads downwardly, preferably in a position adjacent to a portion of the mist eliminator 21, to a coil 16 on the evaporator side of the mist eliminator. Extending around this coil and shielding it from the remainder of the evaporator chamber 2 is a wall 18 which forms within it and adjacent mist eliminator a chamber 20 with a bottom 22 sloping toward and passing through the mist eliminator so that any liquid collecting within the chamber 20 will be caused to flow downwardly along the bottom 22 and into the absorption chamber 23. The discharge from the coil 16 enters the sprayhead 17.

In operation, the liquid returning in line 15 will have been heated probably 5 or 10 degrees above its flash point under the pressure which prevails in the evaporation chamber 2. The protective wall 18 is so arranged that a small portion of the spray from the sprayhead 17 enters the top of the chamber 20 and trickles down over the coil 16. The coil 16 will be warm enough because of the refrigerant flowing therethrough that it will cause this liquid from the sprayhead 17 to evaporate on its surface. This will recover the refrigeration from this liquid and also concentrate it so that the residue will be rich in whatever contaminant is present. On the draining off of such liquid from the coil 16 the liquid flows down the sloping bottom 22 of the chamber 20 through the mist eliminator 21 and into the absorber chamber 23 where it joins the absorber stream, later to be reconstituted into regenerated absorbent and refrigerant.

If there be negligible contaminant in the portion of the refrigerant entering the top of chamber 20 then substantially all of that portion which enters the chamber 20 will be evaporated on the surface of the coil 16 and virtually none will be left to flow through the mist eliminator 21 along the sloping wall 22 to be wasted.

The amount of surface on the coil 16 may be arranged so that it will evaporate substantially all of the liquid falling on it even though the temperature of the liquid in the coil 16 may not have been raised very much in the coils 9.

From the foregoing it will be seen that this invention is one wall adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. An absorption refrigeration method employing a liquid absorbent and liquid refrigerant, comprising the steps of passing the refrigerant through an evaporation zone, maintaining a pressure thereon low enough to produce evaporation therein of a portion of said refrigerant and the resultant cooling of the unvaporized portion of said refrigerant, circulating unvaporized refrigerant in heat exchange relation with a warmer medium which it is desired to cool, whereby to cool said warmer medium and warm said refrigerant, passing the so warmed refrigerant through said evaporation zone again, and repeating the process, withdrawing substantially mist free vaporized refrigerant into a closed absorption zone in communication with said evaporation chamber, spraying a liquid absorbent into said absorption zone to absorb the vaporized refrigerant and maintain in said absorption and evaporation zones said low pressure, circulating the partially spent liquid absorbent externally of said absorption zone in indirect heat exchange relation with a cooling medium to extract the heat of condensation and absorption, and spraying the cooled partially spent absorpent back into the vaporous refrigerant in the absorption zone to absorb additional refrigerant, the rate of flow of said partially spent absorbent sprayed back into said vaporous refrigerant in said absorption zone being increased or decreased as the temperature in said evaporation zone rises or falls, respectively.

2. The method of claim 1 in which a side stream of the partially spent absorbent is taken off prior to spraying back and regenerated and the resulting regenerated absorbent and refrigerant are reconstituted and returned respectively to the spraying back step and to the evaporation zone.

3. The method of claim 2 wherein the regeneration is a single effect regeneration and the products thereof are air cooled.

4. The method of claim 2 wherein the regeneration is a two effect regeneration and the products thereof are air cooled.

5. The method of claim 1 in which a portion of the partially spent absorbent is diverted from the stream flowing to the spraying back step and returned to the lower portion of the absorption zone and therein discharged upwardly to provide a collection of liquid therein with its surface the warmest portion thereof.

6. In a refrigeration method in accordance with claim 1 the removal from the refrigerant passing to the evaporation zone of absorbent or other contaminant of higher boiling point than the refrigerant which comprises spraying a portion of the refrigerant entering said zone into indirect heat exchange relationship with refrigerant moving toward said zone to evaporate a portion of said entering refrigerant in such indirect heat exchange relationship and thereby concentrate the contaminant in liquid form, and draining such contaminant in liquid form from the evaporation zone separately from the liquid refrigerant to be recirculated.

7. In an absorption refrigeration system means providing an evaporation chamber, pump means for withdrawing liquid refrigerant from the lower portion of the evaporation chamber, a spray means within the upper portion of the evaporation chamber for spraying refrigerant into said evaporation chamber to evaporate a portion of said refrigerant and thereby cool the remainder, means providing an absorption chamber in communication with said evaporation chamber above their respective lower portions, means between said chambers for preventing the passage of mist therebetween, means for contacting refrigerant vapor in said absorption chamber with an absorbent to absorb the same and produce a pressure in said evaporation chamber low enough to produce evaporation of refrigerant therein at a desired rate, means for withdrawing liquid absorbent from the lower portion of said absorption chamber, cooling the same externally of said absorption chamber and spraying it into the upper portion of said absorption chamber, temperature sensing means located in said evaporation chamber, and means responsive to said sensing means for regulating the amount of absorbent being sprayed into the upper portion of said absorption chamber.

8. In an absorption refrigeration system, means providing an evaporation chamber, pump means for drawing liquid refrigerant from the lower portion of the evaporation chamber, a heat exchanger having an inlet connected to the output from said pump means and an outlet for discharging refrigerant which has passed through said heat exchanger, a spray means within the upper portion of the evaporation chamber connected to such outlet for receiving such refrigerant from the heat exchanger and spraying it into said evaporation chamber to evaporate a portion of said refrigerant and thereby cool the remainder, means providing an absorption chamber in communication with said evaporation chamber above their respective lower portions, means between said chambers for preventing the passage of mist therebetween, means for contacting refrigerant vapor in said absorption chamber with an absorbent to absorb the same and produce a pressure in said evaporation chamber low enough to produce evaporation of refrigerant therein at a desired rate, and heat exchange means in the connection between said heat exchanger and the spray for said refrigerant, said heat exchange means being located in the path of a portion of the spray from said refrigerant spray, and means for draining liquid collecting in the vicinity of the exterior of said heat exchange means into said absorption chamber.

References Cited
UNITED STATES PATENTS

| | | | |
|---|---|---|---|
| 2,003,310 | 6/1935 | Rexwinkle | 62—494X |
| 2,983,110 | 5/1961 | Leonard, Jr. | 62—494X |
| 3,289,427 | 12/1966 | Bourne | 62—494X |
| 3,314,246 | 4/1967 | Hopkins et al. | 62—476X |
| 3,426,547 | 2/1969 | Foster | 62—476X |
| 3,440,832 | 4/1969 | Aronson | 62—476X |

MEYER PERLIN, Primary Examiner

P. D. FERGUSON, Assistant Examiner

U.S. Cl. X.R.
62—476, 489